United States Patent
Veith

[11] 3,808,364
[45] Apr. 30, 1974

[54] DEVICE FOR THE ELECTRONIC RECORDING OF THE INSTANTANEOUS LOCATION OF A SENSING PROBE ON THE SURFACE OF A PLATE

[75] Inventor: Richard Veith, Munich, Germany

[73] Assignee: Siemens Aktiengesellschaft, Berlin and Munich, Germany

[22] Filed: Mar. 30, 1972

[21] Appl. No.: 239,640

[30] Foreign Application Priority Data
Aug. 25, 1971 Germany.............................. 2142676

[52] U.S. Cl........................ 178/19, 178/18, 310/9.7
[51] Int. Cl............................................... G08c 21/00
[58] Field of Search........... 178/18, 17, 20; 310/9.8, 310/9.7, 3.6; 340/146.3 SY; 346/139 C

[56] References Cited
UNITED STATES PATENTS

| | | | |
|---|---|---|---|
| 3,528,295 | 6/1968 | Johnson et al........................ | 178/18 |
| 3,657,475 | 4/1972 | Peronneau et al.................... | 178/18 |
| 3,684,828 | 8/1972 | Maher.................................. | 178/18 |
| 3,134,099 | 5/1964 | Woo ..................................... | 178/18 |
| 3,618,019 | 11/1971 | Nemirovsky et al.................. | 178/18 |
| 3,582,839 | 6/1971 | Pim....................................... | 310/9.8 |
| 3,562,792 | 6/1968 | Berlincourt et al.................. | 310/9.7 |

OTHER PUBLICATIONS
"Acoustical Data Input Panel", J. B. Gunn & K. L. Konnerth, IBM Technical Disclosure Bulletin, Vol. 12, No. 3, August 1969.

*Primary Examiner*—Thomas A. Robinson
*Attorney, Agent, or Firm*—Hill, Gross, Simpson, Van Santen, Steadman, Chiara & Simpson

[57] ABSTRACT

A device for electronically registering the instantaneous location of a probe on the surface of a plate made of piezoelectric material in which essentially strip-shaped electrodes are arranged at least at two sides of one surface of the plate with an electrode or electrodes opposite thereto on the other side of such plate, such strip-shaped electrodes being positioned at an angle with respect to each other. The probe is provided with an electrode at its tip. The device is designed in particular for the instantaneous recording of a character pattern which is written with a probe, such as a pen or stylus.

Electric pulses are supplied across the probe electrode and the electrode on the underside of said plate which produce mechanical wave trains whose fronts travel across the plate to the edges having the strip-shaped electrode. The mechanically vibrating piezoelectric material between said strip-shaped electrodes and said opposite electrode on the underside of said plate produces an alternating voltage across each strip-shaped electrode and its opposite electrode. This voltage is transferred to the registering device where the time of its reception and the time of the probe excitation voltage is compared to measure the transit times of the mechanical wave trains. By measuring the relative transit time of each set of electrode pairs, the exact location of the probe at each instant of time is determined.

16 Claims, 2 Drawing Figures

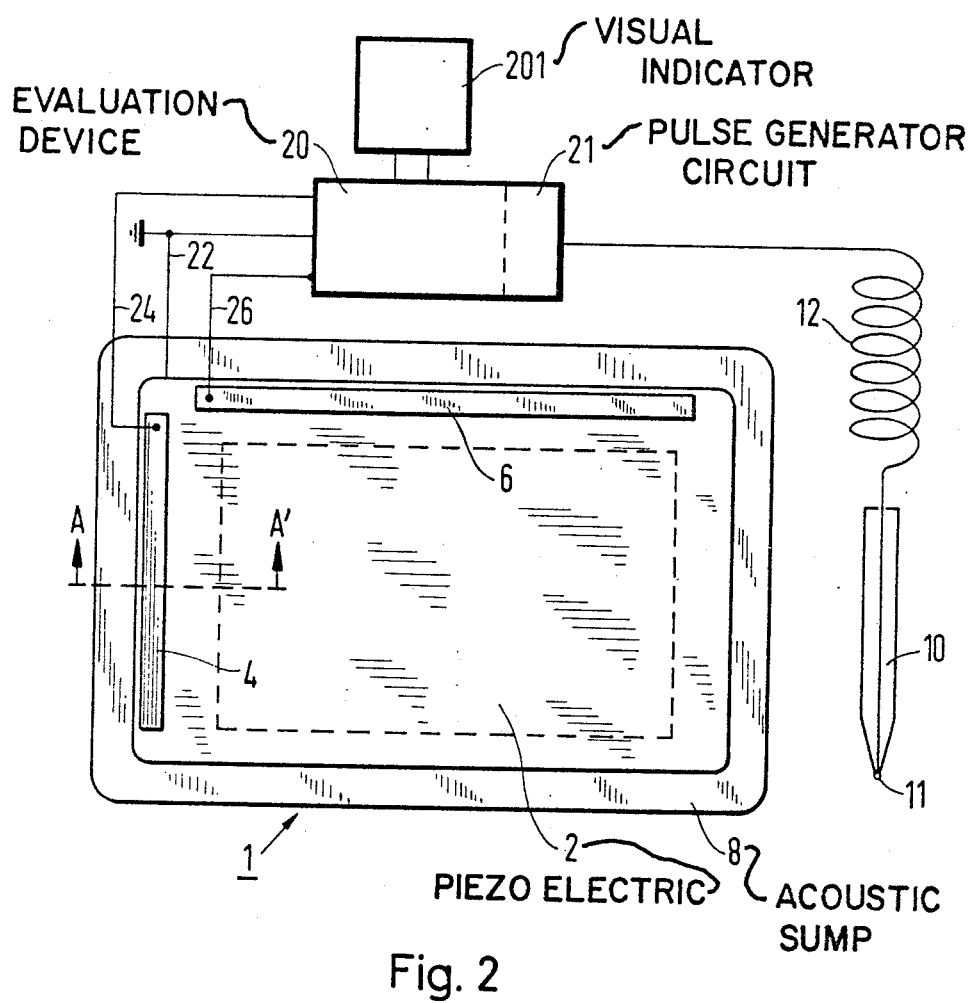

3,808,364

DEVICE FOR THE ELECTRONIC RECORDING OF THE INSTANTANEOUS LOCATION OF A SENSING PROBE ON THE SURFACE OF A PLATE

CROSS-REFERENCE TO RELATED APPLICATIONS

In an application assigned to the same assignee as the present application, filed concurrently herewith and identified as Ser. No. 239,638, the arrangement is generally similar to the present invention with the exception that mechanical wave trains are sequentially pulsed from means, preferably from the electrode strips at two edges of the piezoelectric plate and these wave trains when reaching the probe generate a voltage between the probe electrode and its associated underside electrode. The receipt of this piezoelectrically generated voltage is compared timewise with the timing of the pulsed voltage to the electrode pairs at the side edges of the plate.

BACKGROUND OF THE INVENTION

1. Field of the Invention

This invention relates in general to a system which is designed to record the movement of a probe or stylus on a plate such, for example as handwriting, signatures, or line drawings and either reproduce them at the time or store them in a storage memory and reproduce them at a later time.

2. Description of the Prior Art

The broad concept of providing a device for the electronic recording of the instantaneous location of a sensing probe is known.

One system of this type is described in IEEE Transactions on Electronic Computers, Oct. 1964, pp. 609–611. In this prior art system mechanical surface waves are coupled into a glass plate through means arranged at a pair of adjacent edges of the glass plate. The coupling means are arranged in such a way that they are able to transmit surface waves in orthogonal directions, that is, in the x-direction and y-direction. The mechanical surface waves moving through the glass plate can be detected by a sensing probe for sensing mechanical oscillations. The probe comprises a transducer to change the mechanical oscillations picked up from the plate by the tip of the probe into electric signals which, in turn, are fed to an evaluation device which evaluates them.

In this prior art device, the impulse-shaped wave package of high frequency oscillations, for example, 25 MHz, are coupled into the glass plate sequentially with respect to time for the x-direction and the y-direction, respectively. In this manner each point of the surface through which the two waves move is recorded and precisely located by two coordinates. With the help of the evaluation device, the transit time of each respective wave package from its production until its reception at the location of the probe is detected and registered. From the transit time for wave packages in the x-direction and the transit time for wave packages in the y-direction, the x- and y-coordinates of the instantaneous location of the prove are detected. Means is provided for substantially complete absorption of those wave packages which have crossed the plate and hence no false reading is obtained by a reflected wave.

The sequential timing of the transmission of the wave packages through the plate is effected so rapidly that a movement of the probe, for instance, according to writing speeds for handwritten character patterns, can almost always be followed and recorded.

A piezoelectric sensing system is provided for the probe, as it is applied, for instance, for sound pickups.

Other systems have also been provided in the past for registering the instantaneous position of a probe on a plate such, for example, as provided in a close raster on the surface of the plate made up of crossed, strip-shaped electrodes which are insulated from each other. The resolution power of the device of this character, however, is limited due to the density of the electrode strips.

Still another form of prior art device in this general field is a device which employs a plate with a continuously electrically conductive surface and which has alternating currents fed in at its edges according to a predetermined scheme. The scheme is selected in such a way that due to the potential distribution in the surface each location has a clearly defined alternating potential which can be sensed with the probe. This type of system, however, requires homogeneous conductivity in the surface and an expensive electronic system for feeding and evaluating the detected potentials.

A further similar device provides that surface waves are coupled in x- and y-directions in a glass plate with the help of piezoelectric excitations and the echo is recorded which is returned from the place of the probe. One disadvantage of this system is that the echo which is reflected from a pointed probe has very little energy.

SUMMARY OF THE INVENTION

The broad aspects of the invention are set forth in the abstract. In this connection, it is to be noted that it is an object of this invention to utilize a piezoelectric material plate on which a probe is used to write or draw and in which the probe is electrically pulsed to produce mechanical waves trains across the piezoelectric plate which spread in the material of the plate and in which sensing elements located at two non-parallel edges of a predetermined area on the plate reconvert the mechanical vibrations of the wave trains into a pulse electrical signal. By comparing time of start of the input pulsed signal with the time of arrival of the wave front producing the output signals at either of the two non-parallel sensing elements the exact instantaneous positions of the probe is determined.

BRIEF DESCRIPTION OF THE DRAWINGS

FIG. 1 is a diagrammatic view of a device formed according to the present invention, along with its evaluation device and probe.

FIG. 2 is a fragmentary diagrammatic view partly in section of the device as taken along the line AA$^1$ of FIG. 1.

DESCRIPTION OF THE PREFERRED EMBODIMENTS

In FIG. 1 of the drawings, a plate 1 is shown formed of piezoelectric material. This plate should be kept so thin that the thickness is small with respect to the length of the wave train which may be produced in the plate by means of the probe 10. Preferably, the plate is polarized in the direction of its thickness.

The probe 10 is electrically connected to an electronic circuit 21 which forms a part of an evaluation device 20, via an electric connection line 12. The probe 10 has an electrode 11 at its tip which, during the recording process, is guided with the probe over the surface of plate 1.

A coating 30, which is slightly electrically conductive, is preferably disposed on the surface of the plate 1. The conductivity $\sigma$ of the coating 30 is preferably selected so as to satisfy the equation $\sigma = \epsilon/T \cdot d_1/d_2$ $\epsilon$ is the dielectric constant of the piezoelectric material of the plate 1, T is the duration of an electric impulse which will hereinafter be referred to. $d_1$ is the thickness of the conductive coating 30 and $d_2$ is the thickness of the piezoelectric material of the plate 1.

During the operation of a device according to this invention, an electric alternating potential is applied to the electrode 11, at the tip of the probe 10. Preferably, this potential consists of a periodic succession of rectangular pulses which are supplied by the circuit 21. When the electrode 11 rests on the surface of the piezoelectric material of the plate 1 or on the surface of the coating 30, respectively, mechanical wave trains are produced by the alternating potential at the electrode 11 in the piezoelectric material at the place of the probe tip. These wave trains are propagated in the plate with circular wave fronts. The pulse duration is preferably selected so that the impulse produces a wave train consisting essentially only of one oscillation. Preferably the pulse duration is 0.2 µsec.

When a wave train enters the range of the electrodes 4 or 6 respectively, and an electric output signal is produced between the electrode 4 or the electrode 6, respectively, and the opposite electrode, the signal can be sensed between the respective electrode and opposite electrode.

The electrodes 4 and 6 are advantageously arranged at a right angle to each other, on two adjacent edges of a given area of the entire surface of the plate 1. The respective opposite electrode is on the opposite surface of the plate, made of piezoelectric material. A single opposite electrode 5 is preferably provided for the electrodes 4 and 6, which is designed as a coating on the back of the piezoelectric material of the plate. This provides a high conductive film on the entire under surface. This coating also acts as the opposite electrode for the electrode 11 at the tip of the probe 10.

8 is an acoustic sump at the edge of the plate.

The electrodes 4 and 6 as well as the opposite electrode 5 are connected with the evaluation device 20 by the electric connection lines 24, 26 and 22.

With the help of the evaluation device 20, the transit times of a mechanical wave train are detected from the instant of their production at the instantaneous location of the probe on the surface of the plate 1 until they reach the electrode 4 or the electrode 6, respectively. Electric signals can be formed from these transit times according to known prior art methods and they correspond to the cartesian coordinates of the instantaneous location of the tip of the probe on the plate. The evaluation device uses the timewise first flank of the voltage signal occurring at the electrode 4 or 6, respectively, for detecting the transit times. Compensations of signals occur for those parts of the wave train which do not reach the electrodes 4 or 6, respectively, from a vertical direction.

Advantageously, an acoustic sump 8 is provided at the edges of the plate 1, which substantially eliminates wave train reflections at the edge of the plate.

In order to improve the coupling of the alternating potential applied between the electrode 11 of the probe 10 and the opposite electrode 5 to the piezoelectric material of the plate 1, an electric conductive coating 30 is provided on the upper surface of the piezoelectric material. A good galvanic contact is thus provided between the tip and the piezoelectric material. The above-stated mentioning of the electric conductivity of the material of the coating and the thickness of the coating will result in the fact that the alternating potential at the tip of the probe becomes effective only in a narrowly limited range of the surface of the piezoelectric material, as provided. It is provided, in particular, that this coating on the surface of the piezoelectric material be in a close contact with the surface and firmly attached to it, so that a good galvanic contact between the coating and the surface exists over the entire surface of the plate. For this reason, the evaporation of a semiconductor with corresponding electric conductivity has proven to be advantageous. As long as the character, which is to be recorded by the device according to this invention, is drawn onto a sheet of paper on the plate 1, it is advantageous to use a paper with a conductivity corresponding to the preceding conditions. If the paper is not electrically conductive, a capacitive coupling into the plate will occur. In this case, the contact of the electrode 11 on the plate 1 is indirect.

201 is a visual indicator for the optical reproduction of the character.

We claim as our invention:

1. A piezoelectric sensing device for continuously registering the location of a moving probe over a surface which comprises a plate of piezoelectric material having an area of the surface over which the probe is to be selectively moved, said area having at least two edges angularly oriented with respect to each other, electrodes located at said edges on said surface over which said probe is to be moved, electrode means substantially covering the underside of said plate, whereby electrode pairs are provided by said first mentioned electrodes and said underside electrode, said probe having an electrode formed in its tip, whereby a probe electrode pair is provided by said probe and said underside electrode, means for electrically pulsing said probe electrode to provide a mechanical wave train in said plate, connection lines for transmitting the pulses piezoelectrically produced in said edge located electrode pairs to a registering and storage device.

2. A device according to claim 1 in which said first mentioned electrodes are in the form of strips extending substantially along the length of the edge of said area with which each is associated.

3. A device according to claim 2 in which said electrodes are vapor deposited thin film electrodes.

4. A device according to claim 3 in which a thin film slightly conductive coating overlies substantially all of the upper surface of said plate in a position spaced from said strip electrodes.

5. A device according to claim 4 in which said thin film upper coating has a conductivity satisfied by the equation $\sigma = \epsilon/T \cdot d_1/d_2$ 6. A device according to claim 1 in which said piezoelectric material plate has a thickness of 0.1 to 1.0 mm.

7. A device according to claim 1 in which said piezoelectric material plate has a thickness of approximately 0.3 mm.

8. A device according to claim 1 in which said piezoelectric plate is vertically polarized in a direction vertical to the surface.

9. A device according to claim 1 in which said probe is in the form of a ball point pen.

10. A device according to claim 5 in which the thickness of said coating is less than 0.2 mm.

11. A device according to claim 4 in which said coating is integral with said plate.

12. The device of claim 1 in which the voltage pulses applied to said probe are rectangular voltage pulses having a duration between 0.2 and 1 $\mu$sec.

13. The device of claim 1 in which the voltage pulses applied to said probe are rectangular voltage pulses having a duration of approximately 0.4 $\mu$sec.

14. The device according to claim 13 in which said wave track is essentially only one oscillation.

15. A device for recording the instantaneous location of a sensing probe on the surface of a plate of piezoelectric or magnetostrictive material in which a succession of internally excited mechanical wave fronts move from the probe towards two adjacent edges in an $x$- and $y$-direction, and sensing means at said two edges for generating electric pulses from the mechanical vibration of said plate resulting from the arrival of the wave fronts at the said two adjacent edges, and means for measuring the time of the generated pulses with the time of excitation of said probe.

16. A device for electronic recording of the instantaneous location of a sensing probe on the surface of a plate comprising: a plate of piezo electric material, two electrodes deposited on the surface, each in the form of a strip extending substantially along two edges of a predetermined writing area of the surface of said plate, a third electrode covering substantially the whole under side of said plate including the area opposite to said writing area as well as opposite to said strip electrodes and forming with said two electrodes, two pairs of electrodes, a probe having a single electrode in its tip and forming with said electrode on the under side of said plate a third pair of electrodes, electric circuit means for producing electric pulses and supplying them to said third pair of electrodes, and means for evaluating signals connected to said two pairs of electrodes to determine the position of said probe from said signals.

* * * * *